(12) United States Patent
Coban et al.

(10) Patent No.: US 10,992,937 B2
(45) Date of Patent: Apr. 27, 2021

(54) COEFFICIENT CODING WITH GROUPED BYPASS BINS

(71) Applicant: QUALCOMM Incorporated, San Diego, CA (US)

(72) Inventors: Muhammed Zeyd Coban, Carlsbad, CA (US); Marta Karczewicz, San Diego, CA (US); Jie Dong, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 23 days.

(21) Appl. No.: 16/443,557

(22) Filed: Jun. 17, 2019

(65) Prior Publication Data

US 2019/0387231 A1 Dec. 19, 2019

Related U.S. Application Data

(60) Provisional application No. 62/686,559, filed on Jun. 18, 2018.

(51) Int. Cl.
*H04N 19/13* (2014.01)
*H04N 19/12* (2014.01)
*H04N 5/232* (2006.01)
*H04N 19/159* (2014.01)
*H04N 19/176* (2014.01)

(52) U.S. Cl.
CPC ......... *H04N 19/13* (2014.11); *H04N 5/23229* (2013.01); *H04N 19/12* (2014.11); *H04N 19/159* (2014.11); *H04N 19/176* (2014.11)

(58) Field of Classification Search
CPC .......................... H04N 19/463; H03M 7/4018

USPC ............. 375/240.24, 240.16, 240.03, 240.18
See application file for complete search history.

(56) References Cited

U.S. PATENT DOCUMENTS

2012/0014454 A1 1/2012 Budagavi et al.
2017/0155909 A1* 6/2017 Sze ........................ H04N 19/91

FOREIGN PATENT DOCUMENTS

WO 2013022748 A1 2/2013

OTHER PUBLICATIONS

Coban M. (Qualcomm)., et al., "Non-CE7: Entropy Coding for Dependent Quantization," 11th JVET Meeting; Jul. 11, 2018-Jul. 18, 2018; Ljubljana, SI (The Joint Video Exploration Team of ISO/IEC JTC1/SC29/WG11 and ITU-T SG.16), No. JVET-K0070, Jul. 17, 2018, XP030199982, Retrieved from the Internet: URL:http://phenix.int-evry.fr/jvet/doc_end_user/documents/11_Ljubljana/wg11/JVET-K0070-v4.zip JVET-K0070-v4.docx [retrieved on Jul. 17, 2018], 6 pages.

(Continued)

*Primary Examiner* — Kiet M Doan
(74) *Attorney, Agent, or Firm* — Shumaker & Sieffert, P.A.

(57) ABSTRACT

A method and apparatus for coding levels of transform coefficients of a block of video data. The levels of transform coefficients are coded using both context-coded bins and bypass-coded bins. A video decoder may receive encoded bins representing levels of transform coefficients of a block of video data, decode context-coded bins of the levels of the transform coefficients in a coefficient-by-coefficient order, and decode bypass-coded bins of the levels of the transform coefficients in the coefficient-by-coefficient order after decoding the context-coded bins.

14 Claims, 7 Drawing Sheets

(56) References Cited

OTHER PUBLICATIONS

Albrecht M., et al., "Description of SDR, HDR and 360° Video Coding Technology proposal by Fraunhofer HHI," 10th JVET Meeting; Apr. 10, 2018-Apr. 20, 2018; San Diego; (The Joint Video Exploration Team of ISO/IEC JTC1/SC29/WG11 and ITU-T SG.16); URL:http://phenix.int-evry.fr/jvet/,,No. JVET-J0014-v4, Apr. 12, 2018, XP030151173, 122 pages.
Bross B., et al., "Versatile Video Coding (Draft 4)," Joint Video Experts Team (JVET) of ITU-T SG 16 WP 3 and ISO/IEC JTC 1/SC 29/WG 11, 13th Meeting: Marrakech, MA, Jan. 9-18, 2019, JVET-M1001-v5, 287 pages.
Chen J., et al., "Algorithm Description of Joint Exploration Test Model 1," Joint Video Exploration Team (JVET) of ITU-T SG16 WP3 and ISO/IEC JTC1/SC29/WG11, 1nd Meeting: Geneva, CH, Oct. 19-21, 2015, JVET-A1001, 27 pp.
Chen J., et al., "Algorithm Description of Joint Exploration Test Model 7 (JEM 7)," 7th Meeting; Joint Collaborative Team on Video Coding (JCT-VC) of ITU-T SC 16 WP 3 and ISO/IEC JTC 1/SC 29/WG 11, No. JVET-G1001v1, Jul. 13-21, 2017, 50 pp.
Ergen S., "ZigBee/IEEE 802.15.4 Summary," Sep. 10, 2004, 37 pp.
IEEE Std 802.11ad-2012: "Part 11: Wireless LAN Medium Access Control (MAC) and Physical Layer (PHY) Specifications—Amendment 3: Enhancements for Very High Throughput in the 60 GHz Band," LAN/MAN Standards Committee of the IEEE Computer Society, Dec. 28, 2012, 628 Pages.
International Search Report and Written Opinion—PCT/US2019/037721—ISA/EPO—dated Aug. 9, 2019.
ITU-T H.223, Series H: Audiovisual and Multimedia Systems, Infrastructure of Audiovisual Services—Transmission Multiplexing and Synchronization, Multiplexing Protocol for Low Bit Rate Multimedia Communication, The International Telecommunication Union, Jul. 2001, 74 pp.
ITU-T H.265, Series H: Audiovisual and Multimedia Systems, Infrastructure of Audiovisual Services—Coding of Moving Video, High Efficiency Video Coding, The International Telecommunication Union, Jun. 2019, 696 pp.
Schwarz H., et al., "Description of Core Experiment 7 (CE7): Quantization and Coefficient coding," 10. JVET Meeting; Apr. 10, 2018-Apr. 20, 2018; San Diego; (The Joint Video Exploration Team of ISO/IEC JTC1/SC29/WG11 and ITU-T SG.16 ); URL:http://phenix.int-evry.fr/jvet/,, No. JVET-J1027-v4, May 18, 2018 (May 18, 2018), pp. 1-18, XP030151325, Section 6.
Sole J., et al., "Transform Coefficient Coding in HEVC," IEEE Transactions on Circuits and Systems for Video Technology, IEEE Service Center, Piscataway, NJ, US, vol. 22, No. 12, Dec. 1, 2012 (Dec. 1, 2012), pp. 1765-1777, XP011487805, ISSN: 1051-8215, DOI: 10.1109/TCSVT.2012.2223055.

* cited by examiner

US 10,992,937 B2

COEFFICIENT CODING WITH GROUPED BYPASS BINS

This application claims the benefit of U.S. Provisional Application No. 62/686,559, filed Jun. 18, 2018, the entire content of which is incorporated by reference herein.

TECHNICAL FIELD

This disclosure relates to video coding, including video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by ITU-T H.261, ISO/IEC MPEG-1 MPEG-2, ITU-T H.262, ISO/IEC MPEG-2 Visual, ITU-T H.263, ISO/IEC MPEG-4 Visual MPEG-4, ITU-T H.263, ITU-T H.264/MPEG-4, Part 10, Advanced Video Coding (AVC), the High Efficiency Video Coding (HEVC) standard, ITU-T H.264 (also known as ISO/IEC MPEG-4 AVC), including its Scalable Video Coding (SVC) and Multiview Video Coding (MVC) extensions, ITU-T H.265/High Efficiency Video Coding (HEVC or(also known as ISO/IEC MPEG-4 HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for implementing a coefficient coding (e.g., encoding and/or decoding) scheme that enables efficient parsing of transform coefficients. A video encoder and video decoder may be configured to encode/decode bins representing levels of transform coefficients. In some examples, a bin may refer to a syntax element that indicates whether or not the absolute value of the level of a transform coefficient is greater than some value. For example, a bin 0 value may indicate if the absolute value of the transform coefficients is greater than zero, a bin 1 value may indicate if the absolute value of the transform coefficients is greater than one, a bin 2 value may indicate if the absolute value of the transform coefficients is greater than two, and so on.

A video encoder and video decoder may be configured to entropy encode/decode the bin values, e.g., using context-adaptive binary arithmetic coding. A video encoder and video decoder may be configured to code some bin values using a context (e.g., context-coded bin values). A context is an adaptive probability model based on previous coded bin values. A video encoder and video decoder may further be configured to code other bin values using a bypass mode (e.g., bypass-coded bin values). In bypass mode, a video encoder and video decoder may be configured to code some bin values using a fixed probability model. In order to improve the parsing of bin values of transform coefficients, this disclosure describes techniques where context-coded bin values are coded, on a coefficient-by-coefficient basis, before coding bypass-coded bin values.

In one example, this disclosure describes, a method of decoding video data, the method comprising receiving encoded bins representing levels of transform coefficients of a block of video data, decoding context-coded bins of the levels of the transform coefficients in a coefficient-by-coefficient order, and decoding bypass-coded bins of the levels of the transform coefficients in the coefficient-by-coefficient order after decoding the context-coded bins.

In another example, this disclosure describes an apparatus configured to decode video data, the apparatus comprising a memory configured to store the video data, and one or more processors in communication with the memory, the one or more processors configured to receive encoded bins representing levels of transform coefficients of a block of the video data, decode context-coded bins of the levels of the transform coefficients in a coefficient-by-coefficient order, and decode bypass-coded bins of the levels of the transform coefficients in the coefficient-by-coefficient order after decoding the context-coded bins.

In another example, this disclosure describes, an apparatus configured to decode video data, the apparatus comprising means for receiving encoded bins representing levels of transform coefficients of a block of video data, means for decoding context-coded bins of the levels of the transform coefficients in a coefficient-by-coefficient order, and means for decoding bypass-coded bins of the levels of the transform coefficients in the coefficient-by-coefficient order after decoding the context-coded bins.

In another example, this disclosure describes a non-transitory computer-readable storage medium storing instructions that, when executed, cause one or more processors configured to decode video data to receive encoded bins representing levels of transform coefficients of a block of the video data, decode context-coded bins of the levels of the transform coefficients in a coefficient-by-coefficient order, and decode bypass-coded bins of the levels of the transform coefficients in the coefficient-by-coefficient order after decoding the context-coded bins.

In another example, this disclosure describes a method of encoding video data, the method comprising receiving levels of transform coefficients of a block of video data, encoding context-coded bins of the levels of the transform coefficients in a coefficient-by-coefficient order, and encoding bypass-coded bins of the levels of the transform coefficients in the coefficient-by-coefficient order after encoding the context-coded bins.

In another example, this disclosure describes an apparatus configured to encode video data, the apparatus comprising a memory configured to store the video data, and one or more processors in communication with the memory, the one or more processors configured to receive levels of transform coefficients of a block of video data, encode context-coded bins of the levels of the transform coefficients in a coefficient-by-coefficient order, and encode bypass-coded bins of the levels of the transform coefficients in the coefficient-by-coefficient order after encoding the context-coded bins.

The details of one or more examples are set forth in the accompanying drawings and the description below. Other features, objects, and advantages will be apparent from the description and drawings, and from the claims.

DETAILED DESCRIPTION

Figure 1:
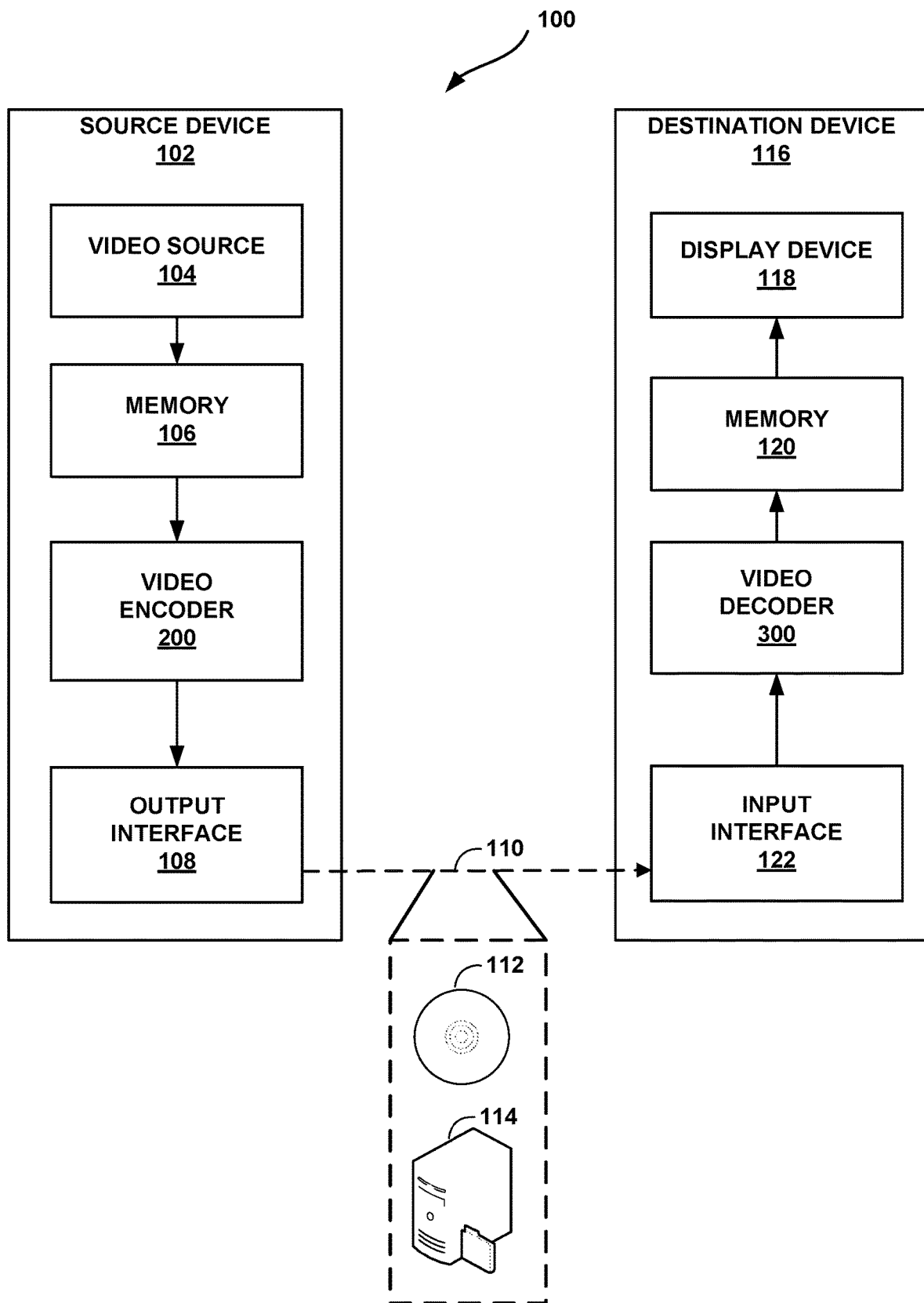
FIG. 1 is a block diagram illustrating an example video encoding and decoding system that may perform the techniques of this disclosure.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, uncoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, tablet computers, set-top boxes, telephone handsets such smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques of this disclosure for efficient parsing of coefficients. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than including an integrated display device.

System 100 as shown in FIG. 1 is merely one example. In general, any digital video encoding and/or decoding device may perform the techniques of this disclosure for efficient parsing of coefficients. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, devices 102, 116 may operate in a substantially symmetrical manner such that each of devices 102, 116 include video encoding and decoding components. Hence, system 100 may support one-way or two-way video transmission between video devices 102, 116, e.g., for video streaming, video playback, video broadcasting, or video telephony.

In general, video source 104 represents a source of video data (i.e., raw, uncoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some example, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may modulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 116. Similarly, destination device 116 may access encoded data from storage device 116 via input interface 122. Storage device 116 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., DSL, cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receiver, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., storage device 112, file server 114, or the like). The encoded video bitstream computer-readable medium 110 may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, such as processing circuitry (including fixed function circuitry and/or programmable processing circuitry), digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

As will be explained in more detail below, video encoder 200 may be configured to receive levels of transform coefficients of a block of video data, encode context-coded bins of the levels of the transform coefficients in a coefficient-by-coefficient order, and encode bypass-coded bins of the levels of the transform coefficients in the coefficient-by-coefficient order after encoding the context-coded bins.

Likewise, as will be explained in more detail below, video decoder 300 may be configured to receive encoded bins representing levels of transform coefficients of a block of the video data, decode context-coded bins of the levels of the transform coefficients in a coefficient-by-coefficient order, and decode bypass-coded bins of the levels of the transform coefficients in the coefficient-by-coefficient order after decoding the context-coded bins.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as the Joint Exploration Test Model (JEM) or ITU-T H.266, also referred to as Versatile Video Coding (VVC). A recent draft of the VVC standard is described in Bross, et al. "Versatile Video Coding (Draft 4)," Joint Video Experts Team (JVET) of ITU-T SG 16 WP 3 and ISO/IEC JTC 1/SC 29/WG 11, 13$^{th}$ Meeting: Marrakech, Mass., 9-18 Jan. 2019, JVET-M1001-v5 (hereinafter "VVC Draft 4"). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to JEM or VVC. According to JEM or VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) partitions. A triple tree partition is a partition where a block is split into three sub-blocks. In some examples, a triple tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of JEM and VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of JEM and VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the coefficients, providing further compression. By performing the quantization process, video encoder 200 may reduce the bit depth associated with some or all of the coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2A:
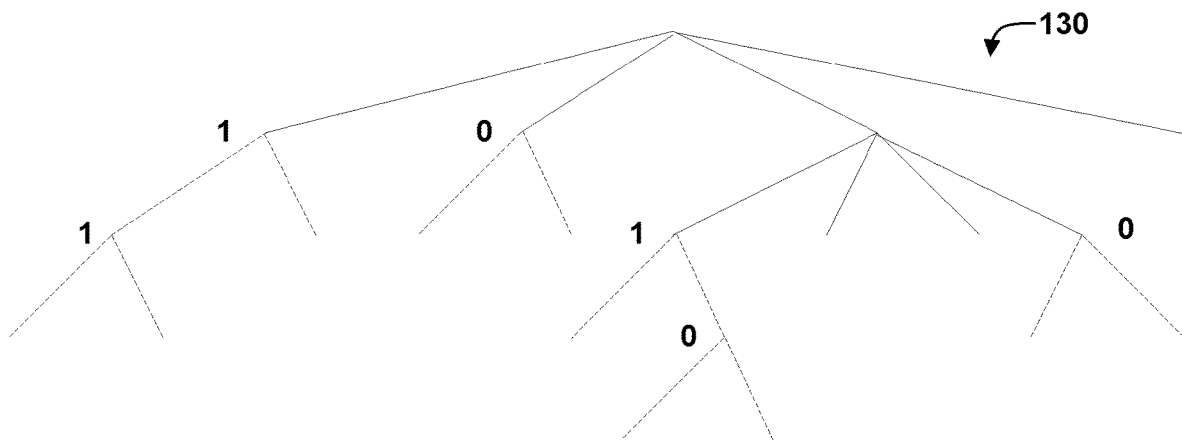
FIGS. 2A and 2B are conceptual diagrams illustrating an example quadtree binary tree (QTBT) structure, and a corresponding coding tree unit (CTU).
Figure 2B:
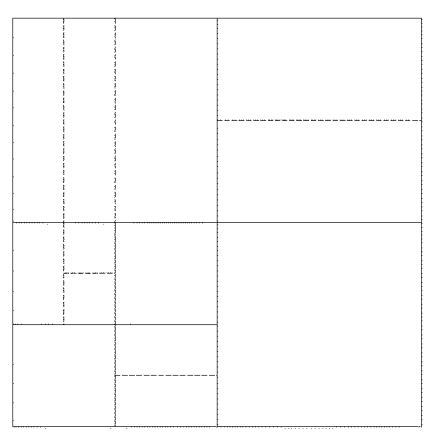

FIGS. 2A and 2B are conceptual diagram illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, since quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), then the nodes can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the leaf quadtree node is 128×128, it will not be further split by the binary tree, since the size exceeds the MaxBTSize (i.e., 64×64, in this example). Otherwise, the leaf quadtree node will be further partitioned by the binary tree. Therefore, the quadtree leaf node is also the root node for the binary tree and has the binary tree depth as 0. When the binary tree depth reaches MaxBTDepth (4, in this example), no further splitting is permitted. When the binary tree node has width equal to MinBTSize (4, in this example), it implies no further horizontal splitting is permitted. Similarly, a binary tree node having a height equal to MinBTSize implies no further vertical splitting is permitted for that binary tree node. As noted above, leaf nodes of the binary tree are referred to as CUs, and are further processed according to prediction and transform without further partitioning.

In accordance with the techniques of this disclosure, video encoder 200 and/or video decoder 300 may implement coefficient coding schemes that enable efficient parsing of transform coefficients. The coefficient coding schemes used in HEVC present one or more potential issues. The techniques of this disclosure mitigate or in some cases eliminate these potential issues. In HEVC, bins representing the levels of transform coefficients are coded (e.g., encoded and decoded) in a bitplane-by-bitplane order (partially).

For example, in a coefficient group (CG), a video coder may first entropy code the greater than 0 (gt0) flags (or "significance flags") of all coefficients. A gt0 flag may also be referred to as bin 0. The gt0 flag indicates if the absolute value of the level of the transform coefficients is greater than zero or not. A video coder may then code all of the greater than 1 (gt1 or bin 1) flags, followed by coding all of the greater than 2 (gt2 or bin 2) flags. The gt1 flag indicates if the absolute value of the transform coefficient is greater than one and the gt2 flag indicates if the absolute value of the transform coefficient is greater than 2. The gt0, gt1, and gt2 flags are context-coded using CABAC. In this example, a context is an adaptive probability model based on the values of previously coded bins.

A video coder may then code the rest of the levels of the transform coefficients as an absolute value of the remaining coefficient level in bypass mode. In bypass mode, rather than coding the bins using a context, a video coder codes the bins using a fixed probability model. One motivation for using this approach is to group all bypass coded bins for simpler parsing. Also, not mixing the order of the bitplanes simplifies multi-bin decoding, where contexts for sequentially decoded coefficients do not depend on the previous coefficient (breaks the dependency), and reduces the cases where speculative decoding needs to be performed (when the next bin to be decoded could belong to a different bitplane). The design described above improves the arithmetic coding throughput.

The coefficient coding scheme of JVET-J0014 ("Description of SDR, HDR, and 360 video coding technology proposal by Fraunhofer HHI" by M. Albrecht, et al, 2018)

breaks with the above-described scheme (of HEVC) by requiring all bitplanes of a transform coefficient to be decoded before moving on to the next transform coefficient. The JVET-J0014 coefficient coding scheme interleaves the bypass-coded and context-coded bins, making multi-bin arithmetic coding more difficult, complex, and/or inefficient.

In accordance with various aspects of this disclosure, video encoder 200 and/or video decoder 300 may be configured to implement an alternative scheme that separates the bypass-coded bins from regular coded (i.e., context-coded) bins in a TU or coefficient group (CG). For example, video encoder 200 and/or video decoder 300 may be configured to implement a transform coefficient coding scheme of this disclosure, according to which regular coded (context-coded) bins of coefficients are coded (e.g., encoded or decoded) coefficient-by-coefficient in a CG of a TU (or in the TU itself, if the TU is not divided into CGs) and the remaining bypass-coded bins representing the levels of the transform coefficients are coded (e.g., encoded or decoded) after coding the regular coded (i.e., context-coded) bins of the CG or TU.

In the scheme described in JVET-J0014, the greater than 0 (significance) flag (bin 0), greater than 1 flag (bin 1), greater than 2 flag (bin 2), greater than 3 flag (bin 3), and greater than 4 (bin 4) bins of a transform coefficient are context-coded (e.g., encoded or decoded). This is one example of the bins video encoder 200 and video decoder 300 may be configured to entropy code using contexts. In other examples, a different number of bins may be context-coded. The techniques of this disclosure are applicable for any number and/or combination of bins that are context-coded. In one example according to JVET-J0014, in the case of a CG, once video encoder 200 and video decoder 300 have coded 16 regular coded (context-coded) bins (not counting the greater than 0 bins) using a context, video encoder 200 and video decoder 300 may be configured to entropy code any remaining bins, including the bins for coefficients having level greater than $\{1,2,3,4\}$, using bypass mode. In general, for this example, video encoder 200 and video decoder 300 may be configured to code the first N bins of a CG that are designated as context-coded bins using CABAC and context. After the first N bins code using CABAC and a context, video encoder 200 and video decoder 300 code any remaining bins, including bins designated for context coding, using bypass mode.

Video encoder 200 and video decoder 300 may be configured to derive the context for the greater than 0 flag (bin 0) from the sum of absolute levels in a causal template using five neighbors, along with the position of the coefficient in the TU or CG. The sum of absolute levels can be used in context calculation, because full coefficients are coded (e.g., encoded or decoded) coefficient-by-coefficient. In one example, the sum of absolute values is capped at 5. Video encoder 200 and video decoder 300 may be configured to derive a context for a greater than X flag (where $X=\{1,2,3,4\}$) from the sum of absolute values computed for the greater than 0 flag context by subtracting the number of non-zero coefficients and capping it at four.

According to the techniques of this disclosure, video encoder 200 and/or video decoder 300 may derive the contexts for context-coded bins based only on the decoded values of the regular coded (context-coded) bins of coefficients. For instance, video encoder 200 may obtain the decoded values of the regular-coded (context-coded) bins by passing the regular-coded (context-coded) context-coded bins through a decoding loop or reconstruction loop. As such, instead of using the sum of absolute coefficients levels, video encoder 200 and/or video decoder 300 may use the sum of absolute coefficient levels up to the last decoded, regular-coded (context-coded) bin of the coefficients. Video encoder 200 and/or video decoder 300 may derive the greater than X context using the sum of absolute coefficient levels up to the last-decoded regular bin (last-decoded context-coded bin) of the coefficients minus the number of non-zero coefficients.

In cases where the TU is divided into CGs, then within a CG, once all regular-coded (context-coded) bins are decoded coefficient-by-coefficient, video encoder 200 and/or video decoder 300 may encode/decode all of the bypass-coded bins, on a coefficient-by-coefficient basis. This is followed by encoding/decoding all the sign bits of the coefficients.

As such, video encoder 200 and/or video decoder 300 may use the techniques of this disclosure to separate the regular-coded (context-coded) bins from the bypass-coded bins on an all-TU or all-CG basis. According to existing techniques, video coding devices first context code a number of bins of a coefficient, and then bypass coded the remaining bins of the same coefficient. This process results in a TU or CG (each with multiple coefficients) having a number of regular-coded (context-coded) bins, followed by a number of bypass-coded bins, followed by regular-coded (context-coded) bins, followed by bypass-coded bins, and so on, resulting in an interleaved structure.

According to techniques of this disclosure, video encoder 200 and/or video decoder 300 process all of the regular-coded (context-coded) bins of a CG first, in a coefficient-by-coefficient order, and then process all of the bypass-coded bins of the CG in a coefficient-by-coefficient order. In cases where a TU is not divided into CGs, video encoder 200 and/or video decoder 300 implement the techniques of this disclosure to process all of the regular-coded (context-coded) bins of the TU first, and then process all of the bypass-coded bins of the TU. In this way, the techniques of this disclosure enable video encoder 200 and/or video decoder 300 to leverage partial context levels in instances where a CG/TU includes bypass-coded bins. By leveraging partial context levels in instances where a CG/TU includes bypass-coded bins, video encoder 200 and/or video decoder 300 may reduce complexity (e.g., by reducing computing resource usage), and may potentially alleviate bandwidth consumption.

Figure 3:
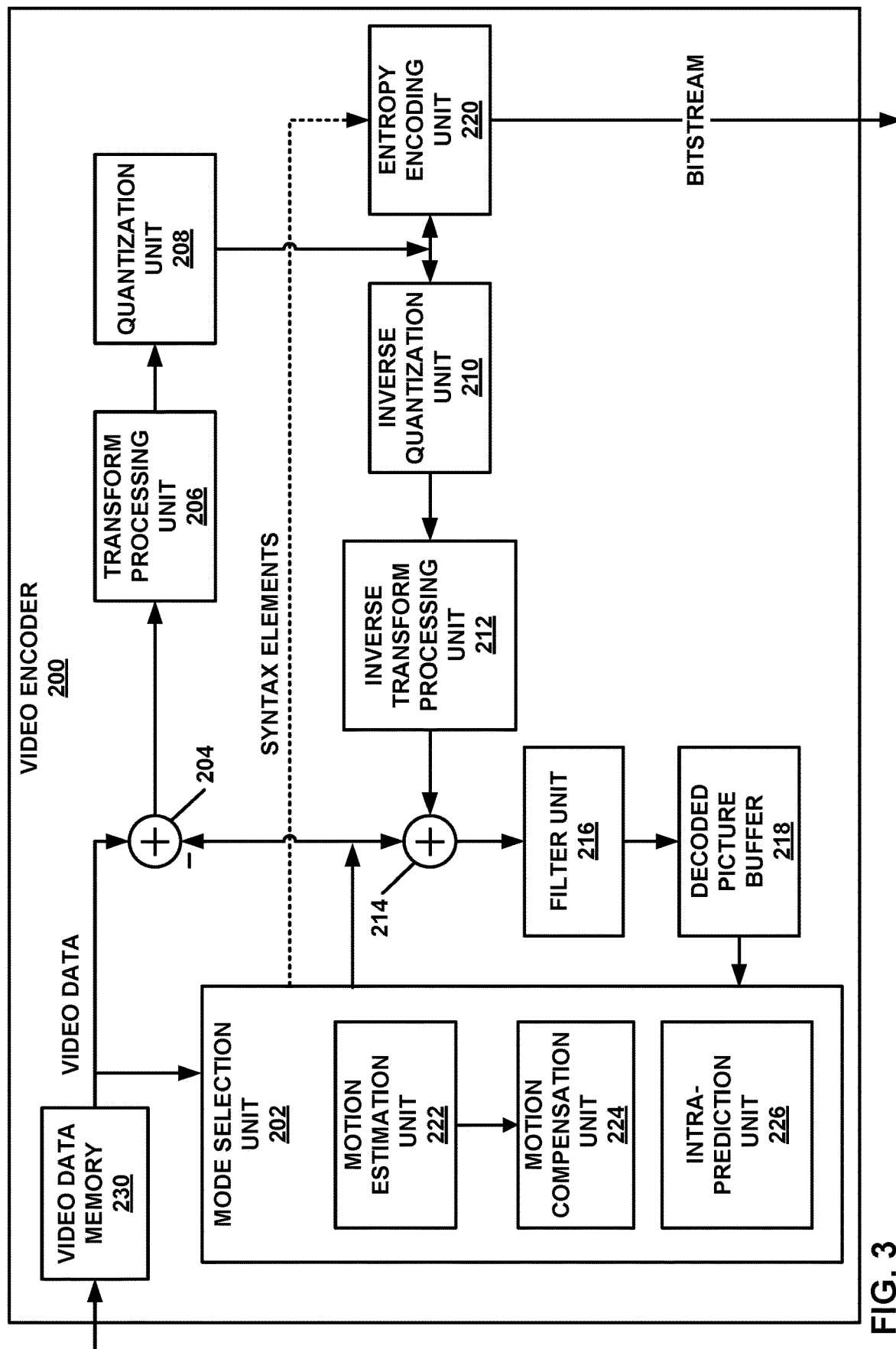
FIG. 3 is a block diagram illustrating an example video encoder that may perform the techniques of this disclosure.

FIG. 3 is a block diagram illustrating an example video encoder 200 that may perform the techniques of this disclosure. FIG. 3 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.266/VVC video coding standard in development. However, the techniques of this disclosure are not limited to these video coding standards, and are applicable generally to video encoding and decoding.

In the example of FIG. 3, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 3 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the object code of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, uncoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

In accordance with the techniques of this disclosure described above, entropy encoding unit 220 may be configured to receive levels of transform coefficients of a block of video data, encode context-coded bins of the levels of the transform coefficients in a coefficient-by-coefficient order, and encode bypass-coded bins of the levels of the transform coefficients in the coefficient-by-coefficient order after encoding the context-coded bins.

Video encoder 200 may output a bitstream that includes the entropy encoded syntax elements needed to reconstruct blocks of a slice or picture. In particular, entropy encoding unit 220 may output the bitstream The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding blocks and the chroma coding blocks.

Video encoder 200 represents an example of a device configured to encode video data including a memory configured to store video data, and one or more processing units implemented in circuitry and configured to perform some of the coefficient coding techniques of this disclosure.

Figure 4:
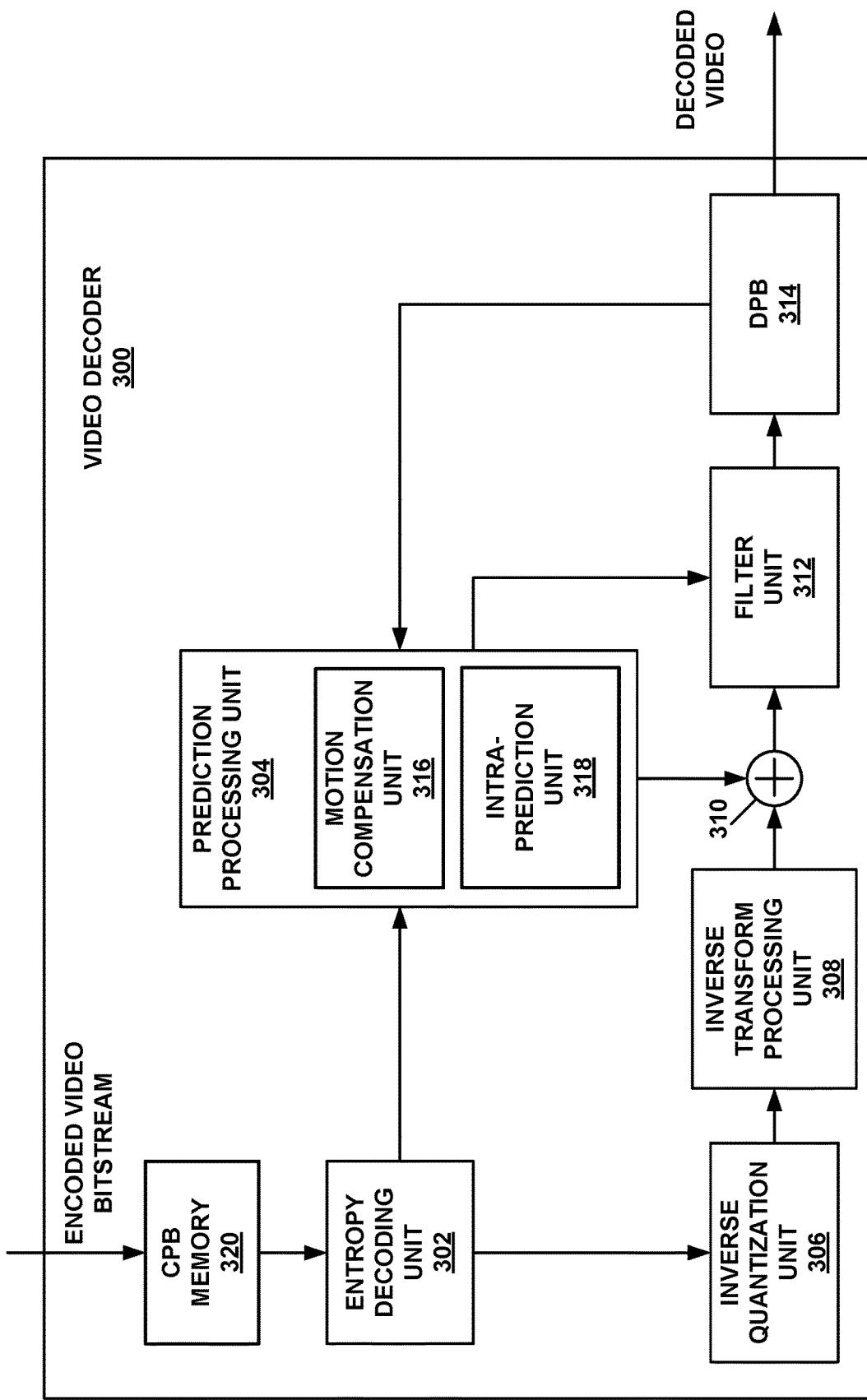
FIG. 4 is a block diagram illustrating an example video decoder that may perform the techniques of this disclosure.

FIG. 4 is a block diagram illustrating an example video decoder 300 that may perform the techniques of this disclosure. FIG. 4 is provided for purposes of explanation and is not limiting on the techniques as broadly exemplified and described in this disclosure. For purposes of explanation, this disclosure describes video decoder 300 is described according to the techniques of JEM and HEVC. However, the techniques of this disclosure may be performed by video coding devices that are configured to operate according to other video coding standards.

In the example of FIG. 4, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Prediction processing unit 304 includes motion compensation unit 316 and intra-prediction unit 318. Prediction processing unit 304 may include addition units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to executed by processing circuitry of video decoder 300.

The various units shown in FIG. 4 are illustrated to assist with understanding the operations performed by video decoder 300. The units may be implemented as fixed-function circuits, programmable circuits, or a combination thereof. Similar to FIG. 3, fixed-function circuits refer to circuits that provide particular functionality, and are preset on the operations that can be performed. Programmable circuits refer to circuits that can programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

In accordance with the techniques of this disclosure described above, entropy decoding unit 302 may be configured to receive encoded bins representing levels of transform coefficients of a block of the video data, decode context-coded bins of the levels of the transform coefficients in a coefficient-by-coefficient order, and decode bypass-coded bins of the levels of the transform coefficients in the coefficient-by-coefficient order after decoding the context-coded bins.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 3).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 3). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures from DPB for subsequent presentation on a display device, such as display device 118 of FIG. 1.

In this manner, video decoder 300 represents an example of a video decoding device including a memory configured to store video data, and one or more processing units implemented in circuitry and configured to perform the coefficient decoding techniques of this disclosure.

Figure 5:
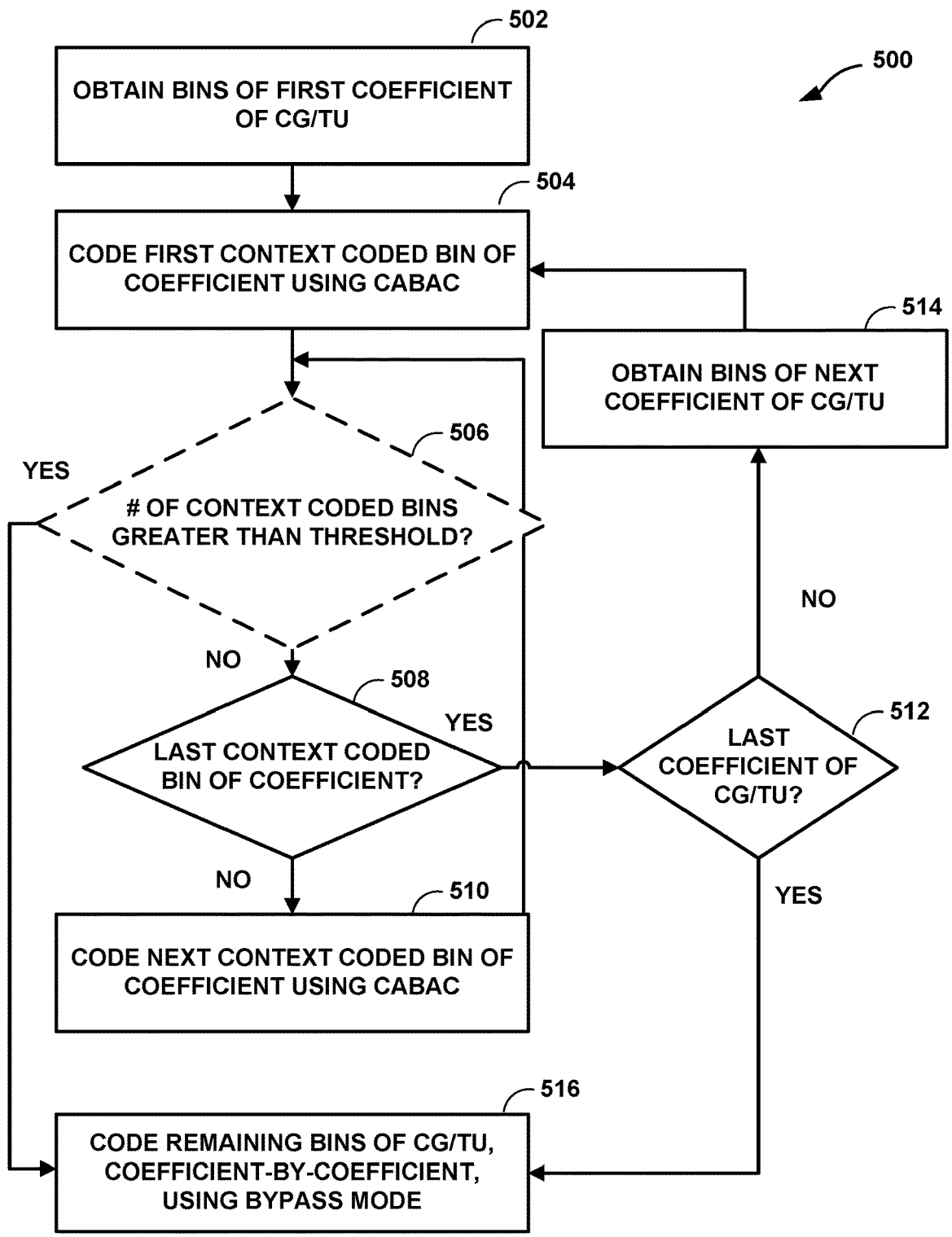
FIG. 5 is a flowchart illustrating an example entropy coding technique of the disclosure.

FIG. 5 is a flowchart illustrating an example entropy coding method 500 of the disclosure. Both entropy encoding unit 220 of video encoder 200 (FIG. 3) and entropy decoding unit 302 of video decoder 300 (FIG. 4) may be configured to operate in accordance with the techniques of FIG. 5.

Entropy encoding unit 220 and entropy decoding unit 302 may be configured to obtain bins of a first coefficient of a CG or TU (502). The bins of the first coefficient represent the level (e.g., the absolute value) of the transform coefficient. Entropy encoding unit 220 and entropy decoding unit 302 may be configured to code (e.g., encode or decode) a first context-coded bin of the coefficient using CABAC (504). As described above, any number or types (e.g., gt0 (bin 0), gt1 (bin 1), gt2 (bin 2)) may be specified as a context-coded bin. The number of and types of bins that are context-coded may be predetermined and stored at both video encoder 200 and video decoder 300.

Entropy encoding unit 220 and entropy decoding unit 302 may be further configured to determine if the number of context-coded bins that have been coded is greater than a threshold (506). This step is optional. That is, the threshold may be set such that all specified context-coded bins possible for a TU/CG are context-coded for the TU/CG. In other examples, the threshold may be set such that a subset of the specified context-coded bins possible for a TU/CG are context-coded for the TU/CG. If entropy encoding unit 220 and entropy decoding unit 302 determine that the number of context-coded bins that have been coded is greater than the threshold, entropy encoding unit 220 and entropy decoding unit 302 then code the remaining bins of the CG/TU, coefficient-by-coefficient, including any uncoded bins specified as being context-coded, using bypass mode (514).

If entropy encoding unit 220 and entropy decoding unit 302 determine that the number of context-coded bins that have been coded is not greater than the threshold, entropy encoding unit 220 and entropy decoding unit 302 then determine if the last context-coded bin of the transform coefficient has been reached (508). If no, entropy encoding unit 220 and entropy decoding unit 302 continue to code the next context-coded bin of the coefficient using CABC (510). This process continues until all context-coded of the transform coefficient are coded. Returning to process 508, if entropy encoding unit 220 and entropy decoding unit 302 determine that the last context coded bin of the transform coefficient has been coded (508), entropy encoding unit 220 and entropy decoding unit 302 then determine if the currently coded coefficient is the last coefficient of the CG/TU 512. If no, entropy encoding unit 220 and entropy decoding unit 302 then obtains the bins of the next transform coefficient of the CG/TU and repeats the above-described processes.

Returning to process 512, once entropy encoding unit 220 and entropy decoding unit 302 reach the last coefficient of the CG/TU, entropy encoding unit 220 and entropy decoding unit 302 then code the remaining bins of the CG/TU, coefficient-by-coefficient, including any uncoded bins specified as being context-coded, using bypass mode (514).

Figure 6:
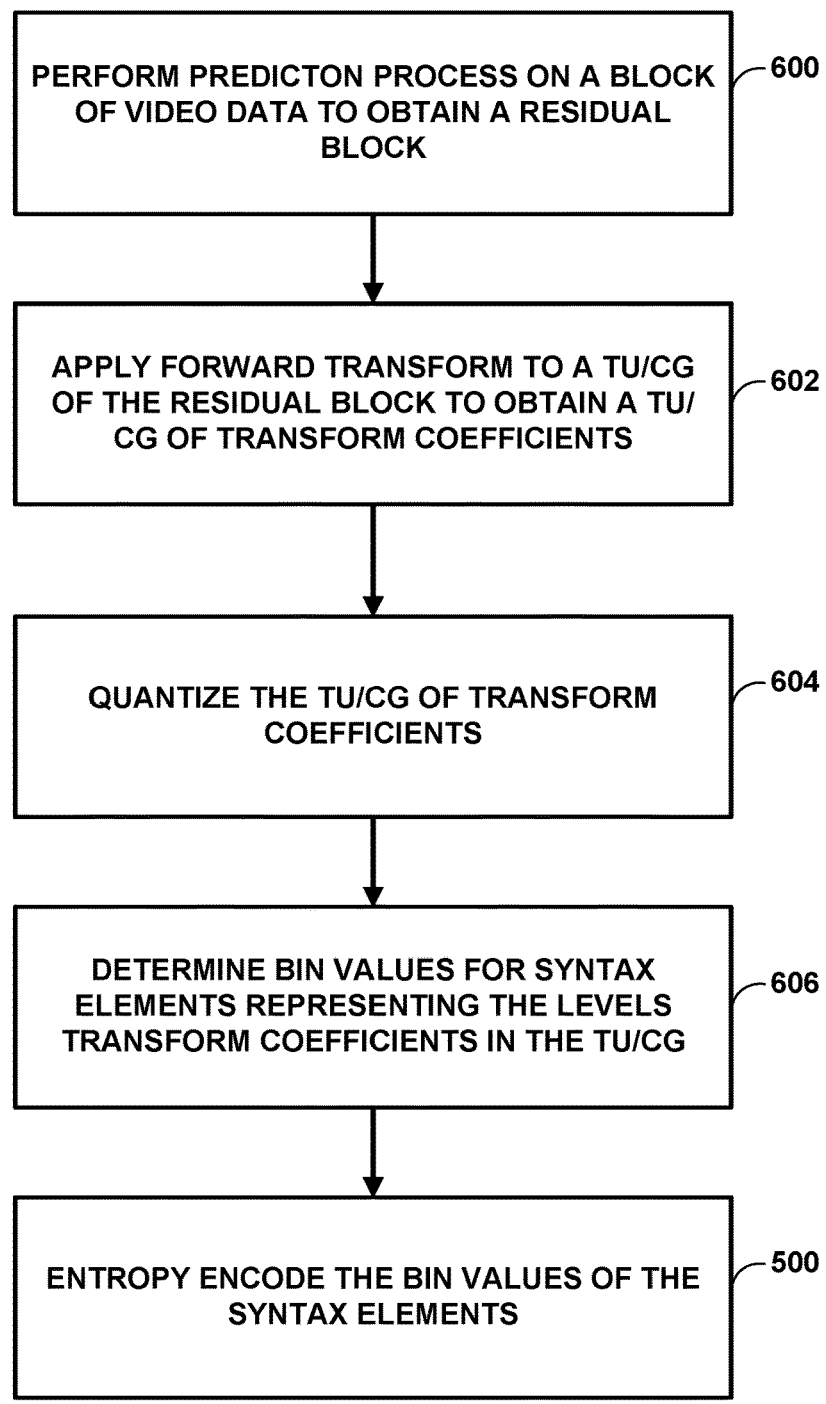
FIG. 6 is a flowchart illustrating an example encoding method of the disclosure.

FIG. 6 is a flowchart illustrating an example encoding method of the disclosure. The techniques of FIG. 6 may be performed by one or more structural units of video encoder 200 including entropy encoding unit 220. Video encoder 200 may be configured to perform a prediction process (e.g., inter prediction, intra prediction, etc.) on a block (e.g., a prediction unit) of video data to obtain a residual block of video data (600). Video encoder 200 may then be configured to apply a forward transform to a TU/CG of the residual block to obtain a TU/CG of transform coefficients (602). In some examples, the TU/CG may be a subset of the residual block. Video encoder 200 may then quantize the TU/CG of transform coefficients.

Video encoder 200 may then determine bin values for syntax elements (e.g., gt0 flag, gt1 flag, gt2 flag, etc.) representing the levels (e.g., absolute values of levels) of the transform coefficients in the TU/CG. Video encoder 200 may then entropy encode the bin values of the syntax elements (500) using the process described above in FIG. 5.

Figure 7:
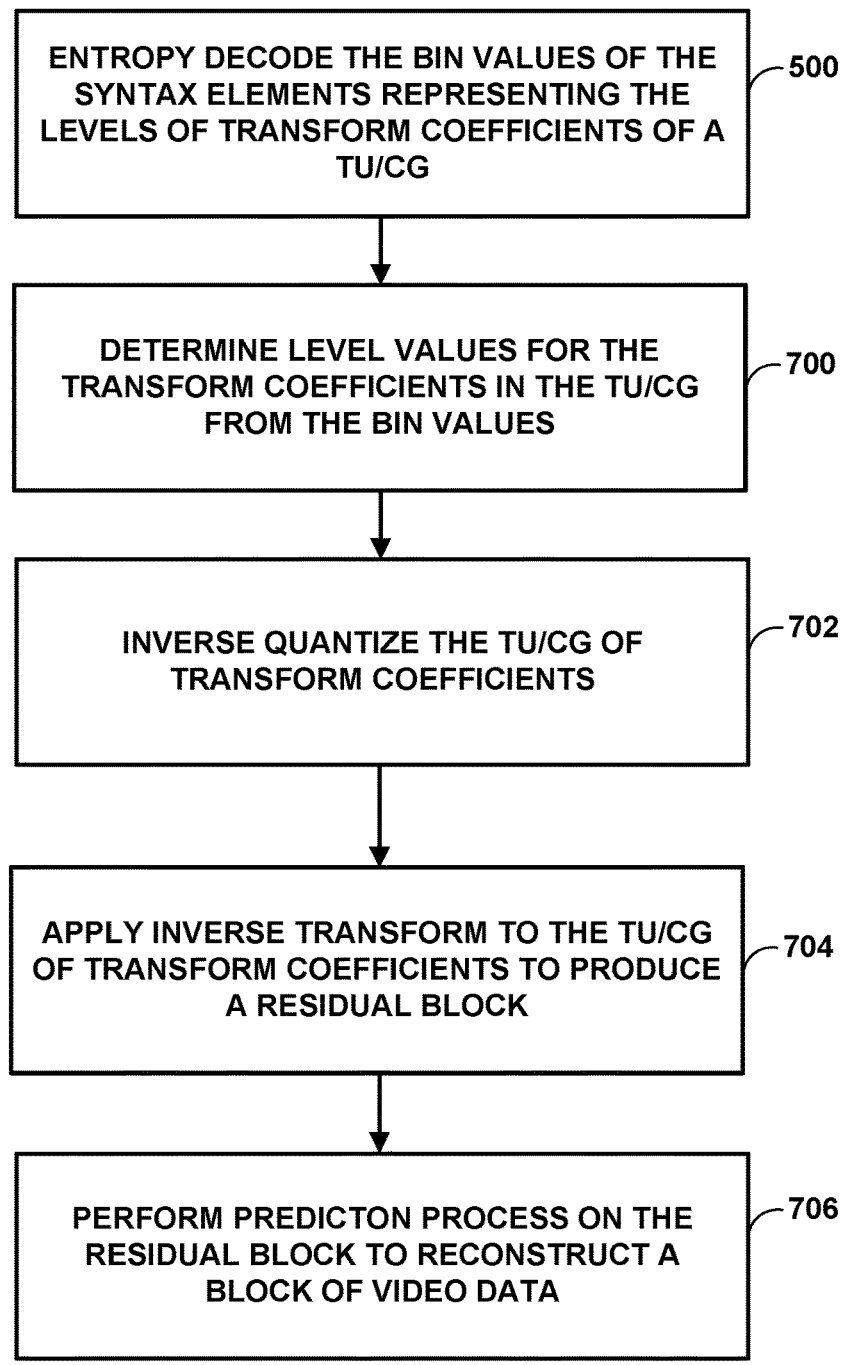
FIG. 7 is a flowchart illustrating an example decoding method of the disclosure.

FIG. 7 is a flowchart illustrating an example decoding method of the disclosure. The techniques of FIG. 7 may be performed by one or more structural units of video decoder 300 including entropy decoding unit 302. The process of FIG. 7 is the inverse of the process of FIG. 6. Video decoder 300 may be configured to entropy decode the bin values of the syntax elements representing the levels of the transform coefficients of a TU/CG (500) using the process described above in FIG. 5. Video decoder 300 may then determine the level values for the transform coefficients in the TU/CG using the decoded bin values (700).

Video decoder 300 may then inverse quantize the TU/CG of transform coefficients (702), and apply an inverse transform to the TU/CG of transform coefficients to produce a residual block (704). Video decoder 300 may then perform a prediction process on the residual block to reconstruct a block of video data (706).

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as processing circuitry (including fixed function circuitry and/or programmable processing circuitry), one or more DSPs, general purpose microprocessors, ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
    receiving encoded bins representing levels of transform coefficients of a block of video data;

determining a respective context for each context-coded bin of the encoded bins based only on decoded values of context-coded bins;

decoding the context-coded bins of the levels of the transform coefficients in a coefficient-by-coefficient order using context-adaptive binary arithmetic coding and the respective context for each of the context-coded bins;

decoding bypass-coded bins of the levels of the transform coefficients in the coefficient-by-coefficient order after decoding the context-coded bins;

decoding sign bins for the transform coefficients in the coefficient-by-coefficient order after decoding the bypass-coded bins;

determining level values for the block of transform coefficients from the decoded context-coded bins, bypass-coded bins, and sign bins;

inverse quantizing the block of transform coefficients;

inverse transforming the inverse quantized block of transform coefficients to produce a block of residual values; and performing a prediction process using the block of residual values to reconstruct a block of video data.

2. The method of claim 1, wherein decoding the context-coded bins comprises decoding the context-coded bins of the levels of the transform coefficients in the coefficient-by-coefficient order using context-adaptive binary arithmetic coding and the respective context for each of the context-coded bins for the first N context-coded bins in the block of video data.

3. The method of claim 2, wherein the block of video data is one of a transform unit or a coefficient group of the transform unit.

4. The method of claim 1, further comprising:
outputting the reconstructed block of video data for display.

5. An apparatus configured to decode video data, the apparatus comprising:
a memory configured to store the video data; and
one or more processors in communication with the memory, the one or more processors configured to:
receive encoded bins representing levels of transform coefficients of a block of the video data;
determine a respective context for each context-coded bin of the encoded bins based only on decoded values of context-coded bins;
decode context-coded bins of the levels of the transform coefficients in a coefficient-by-coefficient order using context-adaptive binary arithmetic coding and the respective context for each of the context-coded bins;
decode bypass-coded bins of the levels of the transform coefficients in the coefficient-by-coefficient order after decoding the context-coded bins;
decode sign bins for the transform coefficients in the coefficient-by-coefficient order after decoding the bypass-coded bins;
determine level values for the block of transform coefficients from the decoded context-coded bins, bypass-coded bins, and sign bins;
inverse quantize the block of transform coefficients;
inverse transform the inverse quantized block of transform coefficients to produce a block of residual values; and
perform a prediction process using the block of residual values to reconstruct a block of the video data.

6. The apparatus of claim 5, wherein to decode the context-coded bins, the one or more processors are further configured to decode the context-coded bins of the levels of the transform coefficients in the coefficient-by-coefficient order using context-adaptive binary arithmetic coding and the respective context for each of the context-coded bins for the first N context-coded bins in the block of the video data.

7. The apparatus of claim 6, wherein the block of the video data is one of a transform unit or a coefficient group of the transform unit.

8. The apparatus of claim 5, further comprising:
a display configured to display the reconstructed block of the video data.

9. A method of encoding video data, the method comprising:
performing a prediction process on a prediction block of video data to produce a block of residual values;
applying a forward transform to the block of residual values to produce a block of transform coefficients;
quantizing the block of transform coefficients;
determining context-coded bins, bypass-coded bins, and sign bins for the quantized block of transform coefficients;
receiving levels of transform coefficients of the block of video data;
determining a respective context for each context-coded bin of the levels of the transform coefficients based only on values of context-coded bins;
encoding context-coded bins of the levels of the transform coefficients in a coefficient-by-coefficient order using context-adaptive binary arithmetic coding and the respective context for each of the context-coded bins;
encoding bypass-coded bins of the levels of the transform coefficients in the coefficient-by-coefficient order after encoding the context-coded bins; and
encoding sign bins for the transform coefficients in the coefficient-by-coefficient order after encoding the bypass-coded bins.

10. The method of claim 9, wherein encoding the context-coded bins comprises encoding the context-coded bins of the levels of the transform coefficients in the coefficient-by-coefficient order using context-adaptive binary arithmetic coding and the respective context for each of the context-coded bins for the first N context-coded bins in the block of video data.

11. The method of claim 9, further comprising:
capturing the video data with a camera.

12. An apparatus configured to encode video data, the apparatus comprising:
a memory configured to store the video data; and
one or more processors in communication with the memory, the one or more processors configured to:
perform a prediction process on a prediction block of video data to produce a block of residual values;
apply a forward transform to the block of residual values to produce a block of transform coefficients;
quantize the block of transform coefficients;
determine context-coded bins, bypass-coded bins, and sign bins for the quantized block of transform coefficients;
receive levels of transform coefficients of the block of video data;
determine a respective context for each context-coded bin of the levels of the transform coefficients based only on values of context-coded bins;
encode context-coded bins of the levels of the transform coefficients in a coefficient-by-coefficient order using context-adaptive binary arithmetic coding and the respective context for each of the context-coded bins;

encode bypass-coded bins of the levels of the transform coefficients in the coefficient-by-coefficient order after encoding the context-coded bins; and encode sign bins for the transform coefficients in the coefficient-by-coefficient order after encoding the bypass-coded bins.

13. The apparatus of claim 12, wherein to encode the context-coded bins, the one or more processor are further configured to encode the context-coded bins of the levels of the transform coefficients in the coefficient-by-coefficient order using context-adaptive binary arithmetic coding and the respective context for each of the context-coded bins for the first N context-coded bins in the block of video data.

14. The apparatus of claim 12, further comprising:
a camera configured to capture the video data.

* * * * *